(12) United States Patent
Stephens, Jr.

(10) Patent No.: US 9,298,509 B2
(45) Date of Patent: Mar. 29, 2016

(54) RESOURCE RESERVATION FROM TWO OR MORE RESOURCES EFFECTIVE TO PROCESS A RESERVATION REQUEST

(75) Inventor: James Stephens, Jr., Austin, TX (US)

(73) Assignee: Empire Technology Development LLC, Wilmington, DE (US)

( * ) Notice: Subject to any disclaimer, the term of this patent is extended or adjusted under 35 U.S.C. 154(b) by 914 days.

(21) Appl. No.: 13/058,303

(22) PCT Filed: Oct. 5, 2010

(86) PCT No.: PCT/US2010/051463
§ 371 (c)(1),
(2), (4) Date: Feb. 9, 2011

(87) PCT Pub. No.: WO2012/047204
PCT Pub. Date: Apr. 12, 2012

(65) Prior Publication Data
US 2012/0084785 A1    Apr. 5, 2012

(51) Int. Cl.
*G06F 9/455*    (2006.01)
*G06Q 10/00*    (2012.01)
*G06F 9/50*    (2006.01)
*G06Q 10/02*    (2012.01)

(52) U.S. Cl.
CPC .............. *G06F 9/5027* (2013.01); *G06Q 10/02* (2013.01); *G06F 2209/5014* (2013.01)

(58) Field of Classification Search
None
See application file for complete search history.

(56) References Cited

U.S. PATENT DOCUMENTS

| 7,529,943 | B1 | 5/2009 | Beser |
| 7,584,262 | B1 | 9/2009 | Wang et al. |
| 7,693,734 | B2* | 4/2010 | Christenson et al. ........ 705/7.19 |
| 8,402,517 | B2* | 3/2013 | Hawkins et al. .................. 726/5 |
| 2002/0069094 | A1* | 6/2002 | Bingham et al. .................. 705/5 |
| 2003/0083919 | A1* | 5/2003 | Hammann ........................ 705/8 |
| 2004/0215780 | A1* | 10/2004 | Kawato ........................ 709/226 |
| 2005/0117587 | A1* | 6/2005 | Kawato .................... 370/395.21 |
| 2005/0246666 | A1* | 11/2005 | Kalinoski et al. ............. 715/963 |
| 2008/0235065 | A1* | 9/2008 | Dan et al. .......................... 705/5 |

(Continued)

FOREIGN PATENT DOCUMENTS

GB    2422453    7/2006

OTHER PUBLICATIONS

"EMS Workplace," Copyright © 2010 Dean Evans & Associates, Inc.

(Continued)

*Primary Examiner* — Tammy Lee
(74) *Attorney, Agent, or Firm* — Moritt Hock & Hamroff LLP; Steven S. Rubin, Esq.

(57) ABSTRACT

Technologies are generally described for systems and methods for requesting a reservation between a first and a second processor. In some examples, the method includes receiving a reservation request at the second processor from the first processor. The reservation request may include an identification of a resource in communication with the second processor, a time range, first key information relating to the first processor, and a first signature of the first processor based on the first key information. In some examples, the method includes verifying, by the second processor, the reservation request based on the first key information and the first signature. In some examples, the method includes determining, by the second processor, whether to accept the reservation request.

19 Claims, 4 Drawing Sheets

(56) References Cited

U.S. PATENT DOCUMENTS

2009/0204471 A1* 8/2009 Elenbaas et al. .............. 705/9
2010/0125670 A1* 5/2010 Dondeti et al. .............. 709/229

OTHER PUBLICATIONS

Legrand et al. (2003) "Scheduling Distributed Applications: the SimGrid Simulation Framework"; IEEE Computer Society, p. 1-8.
Buyya (2002) "Economic-based Distributed Resource Management and Scheduling for Grid Computing"; Ph.D Thesis, p. 1-166.
Eymann et al. (2003) "Decentralized Resource Allocation in Application Layer Networks"; p. 1-6.
Foster et al. (1999) "A Distributed Resource Management Architecture that Supports Advance Reservations and Co-Allocation"; p. 1-16.
Fu et al. (2003) "SHARP: An Architecture for Secure Resource Peering"; SIGOPS Oper. Syst. Rev., 37(5): p. 133-148.
PCT International Search Report PCT/ISA/210.
PCT Written Opinion of the International Searching Authority PCT/ISA/220.
Tham et al. (2004) "A Distributed Peer-to-Peer Platform for Synchronized Group Collaboration and Knowledge Sharing"; p. 1-6.
Sharma et al. (2006) "An Improved Resource Discovery Approach Using P2P Model for Condor: A Grid Middleware"; World Academy of Science, Engineering and Technology; 17: p. 55-59.
"System and method for ad-hoc resource reservation loan process within an automation environment"; IBM Intellectual Property Communication No. IPCOM000180403D (Mar. 9, 2009).

* cited by examiner

RESOURCE RESERVATION FROM TWO OR MORE RESOURCES EFFECTIVE TO PROCESS A RESERVATION REQUEST

CROSS REFERENCE TO RELATED APPLICATIONS

This application is a U.S. National Stage filing under 35 U.S.C. §371 of International Application No. PCT/US2010/051463 filed Oct. 5, 2010.

BACKGROUND

Unless otherwise indicated herein, the materials described in this section are not prior art to the claims in this application and are not admitted to be prior art by inclusion in this section.

A network may include two or more processors in communication with each other through a communication link. In a cloud network environment, resources in communication with processors may be shared among processors in communication with the cloud. Resources may include processors, memories, displays, communication links, etc.

SUMMARY

In an example, a method for requesting a reservation between a first and a second processor is generally described. In some examples, the method includes receiving a reservation request at the second processor from the first processor. The reservation request may include an identification of a resource in communication with the second processor, a time range, first key information relating to the first processor, and a first signature of the first processor based on the first key information. The method may include verifying, by the second processor, the reservation request based on the first key information and the first signature. The method may include determining, by the second processor, whether to accept the reservation request.

In an example, a system effective to request a reservation between a first and a second processor is generally described. The system may include a first processor and a second processor. The second processor may be effective to be in communication with the first processor. The second processor may be effective to receive a reservation request from the first processor. The reservation request may include an identification of a resource effective to be in communication with the second processor, a time range, first key information relating to the first processor, and a first signature of the first processor based on the first key information. The second processor may be effective to verify the reservation request and determine whether to accept the reservation request.

In an example, a method for requesting a reservation between a first and a second processor is generally described. In some examples, the method includes receiving, at a third processor, first registration data from the first processor. The first registration data may include first key information relating to the first processor. The method may include receiving, at the third processor, second registration data from the second processor. The second registration data may include second key information relating to the second processor. The method may include receiving a reservation request at the second processor from the first processor. The reservation request may include an identification of a resource in communication with the second processor, a time range, the first key information, and a first signature of the first processor based on the first key information. The method may include sending a list request by the second processor to the third processor. The list request may include an identification of the time range, the first signature, and a second signature of the second processor. The second signature may be based on the second key information. The method may include receiving by the second processor, from the third processor, a list of the reservation data relating to the first processor and the time range. The method may include determining, by the second processor, whether to accept the reservation request based on the list.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
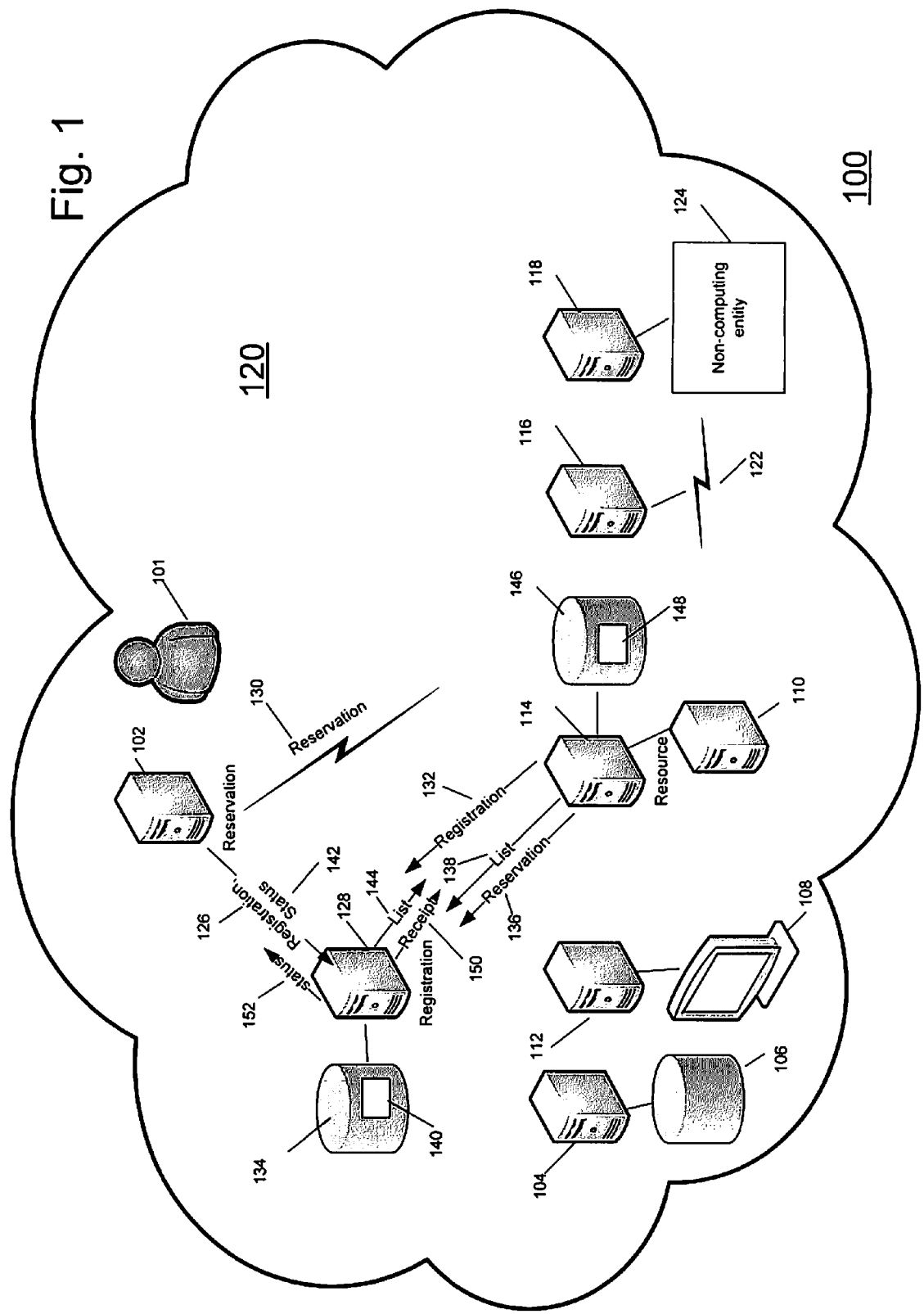
FIG. 1 illustrates some example systems that can be utilized to implement resource reservation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to resource reservation.

Briefly stated, technologies are generally described for systems and methods for requesting a reservation between a first and a second processor. In some examples, the method includes receiving a reservation request at the second processor from the first processor. The reservation request may include an identification of a resource in communication with the second processor, a time range, first key information relating to the first processor, and a first signature of the first processor based on the first key information. In some examples, the method includes verifying, by the second processor, the reservation request based on the first key information and the first signature. In some examples, the method includes determining, by the second processor, whether to accept the reservation request.

FIG. 1 illustrates some example systems that can be utilized to implement resource reservation arranged in accordance with at least some embodiments described herein. In some examples, as explained in more detail below, a system 100 may include a reservation processor 102, a registration processor 128 and resources 106, 108, 110, 122, and/or 124 all in communication over a network 120. In some examples, network 120 may be the Internet network. In an example, reservation processor 102 may include an Internet browser. In some examples, resources 106, 108, 110, 122, and/or 124 may be in communication with registration processor 128 and/or reservation processor 102 through respective resource processors 104, 112, 114, 116 and/or 118. In an example, resources may include a memory 106, display 108, processor 110, communication link 122, and/or a non-computing entity such as a conference room 124. In some examples, resources may also include any device or entity that can be placed in communication with a processor, such as a sensor, keyboard, printer, data structure, etc. Registration processor 128 may be in communication with a memory 134 including instructions 140. Multiple registration processors 128 may be placed in a desired geographic area.

In an example, based on a request from a user 101, reservation processor 102 may be configured to send registration data 126 to registration processor 128. In some examples, user 101 may include a person or a device such as a processor. Registration data 126 may include a public key relating to reservation processor 102 and an identification name. The identification name may be unique for each reservation processor registered with registration processor 128. The public key may be based on a public key infrastructure. In some examples, as is explained in more detail below, another processor may be able to receive the public key and verify messages signed with a corresponding private key.

In an example, reservation processor 102 may be configured to select registration processor 128 among two or more registration processors 128 based on a location and/or proximity of registration processor 128 to reservation processor 102. For example, registration processor 128 may be configured to select registration processor 128 based on an IP (internet protocol) address or DNS (domain name system) server used by reservation processor 102.

Similarly, in an example, resources may be configured to register with registration processor 128 by sending registration data 132 to registration processor 128. As an example, registration data 132 is shown being sent from resource processor 114 though one or more of the resources could be configured to send respective registration data 132. In some examples, registration data 132 may include an identification name of resource processor 114 and a corresponding public key.

In some examples, reservation processor 102 may identify a particular resource, with which user 101 desires to create a reservation, and a particular time range. For example, user 101 may use a directory service or searching service such as GOOGLE to identify the particular resource. In some examples, reservation processor 102 may be configured to send a status request 142 to registration processor 128. Status request 142 may include a signature based on the private key of reservation processor 102 and may be adapted to request whether the particular resource is available at the particular time range. In an example, the particular resource may be resource 110 in communication with resource processor 114.

In some examples, registration processor 128 may be configured to verify status request 142 based on the public key in registration data 126 and the signature in status request 142. In examples where status request 142 is verified by registration processor 128, registration processor 128 may be configured to send a status response 152. Status response 152 may be adapted to indicate whether the particular resource is available at the particular time range. In examples where status request 142 is not verified, registration processor 128 may be configured to avoid responding to status request 142.

Reservation processor 102 may be configured to send reservation data 130 to resource processor 114 in communication with particular resource 110. In some examples, reservation processor 102 may be configured to send reservation data 130 to resource processor 114 based on status response 152. In some examples, reservation data 130 may be adapted to include a reservation request for the particular resource at the particular time range. In some examples, reservation data 130 may include the public key of reservation processor 102 and may include a signature based on private key used by reservation processor 102. In some examples, the reservation request may include a request to cancel a reservation for the particular resource at the particular time range. In an example, resource processor 114 may be configured to verify reservation data 130 based on the public key from reservation processor 102 and the signature.

In some examples, resource processor 114 may be configured to determine in which registration processor 128 reservation processor 102 is registered. For example, as mentioned above, resource processor 114 may be configured to determine a location of reservation processor 102 and determine the registration processor 128 geographically close to that location based on IP address or DNS server.

In an example, resource processor 114 may be configured to send a list request 138 to registration processor 128. In some examples, list request 138 may be adapted to include an identification of reservation processor 102, an identification of resource 110, and the particular time range in reservation data 130. List request 138 may be adapted to include signatures based on private keys of both resource processor 114 and reservation processor 102. In some examples, registration processor 128 may be configured to verify list request 138 using public keys of reservation processor 102 and resource processor 114 and the signatures.

In examples where registration processor 128 verifies list request 138, registration processor 128 may be adapted to search memory 134 and generate and send a list 144 of registrations relating to reservation processor 102. In some examples, list 144 may be adapted to include reservations by reservation processor 102 including time ranges intersecting the particular time range in reservation data 130. In some examples, based on list 144 and instructions 148 in memory 146, resource processor 114 may be configured to determine whether to accept the reservation request in reservation data 130. For example, resource processor 114 may be configured to analyze list 144 and determine whether user 101 and/or reservation processor 102 has requested conflicting resources at conflicting times. In an example, resource processor 114 may be configured to determine that a reservation request by a user for a conference room adjacent to an already reserved conference room at the same time should be accepted. In an example, a reservation request for a conference room on a different floor as an already reserved conference room at the same time should be rejected. In some examples, as registration processor 128 may be configured to verify signatures based on private keys of reservation processor 102 and resource processor 114 in list request 138, resource processor 114 may be prevented from learning of reservation requests by other reservation processors.

In examples where resource processor 114 is configured to accept the reservation request in reservation data 130 to create a reservation, resource processor 114 may be configured to send reservation data 136 to registration processor 128. In some examples, reservation data 136 may be adapted to include signatures based on private keys from resource processor 114 and reservation processor 102. Reservation data 136 may also include other information such as the type of the resource and other annotations or metadata regarding the reservation. In some examples, registration processor 128 may be configured to store the metadata in memory 134 and send the metadata to other resource processors that request list data 144. The metadata can later be reviewed by other resource processors and used to determine whether to accept a reservation request. In these examples, an ad hoc taxonomy can be created based on the metadata and subsequently queried in list request 138 and analyzed by resource processors. In an example, a resource processor may decide to accept a reservation request based on whether instructions 148 determine that a user can reserve two resources of a particular type at the same time.

In some examples, registration processor 128 may be configured to receive reservation data 136 and verify the signatures based on private keys of resource processor 114 and reservation processor 102 in reservation data 136. In examples where registration processor 128 verifies the signatures, registration processor 128 may be configured to store reservation data 136 in memory 134 and send reservation data 136 to other registration processors. In these examples, registration processor 128 may be configured to send a receipt 150 to resource processor 114. In some examples, receipt 150 may be adapted to include signatures based on private keys of reservation processor 102 and resource processor 114. In some examples, resource processor 114 may be configured to send receipt 150 to reservation processor 102. In some examples, receipt 150 may be used to prove a reservation was created.

In some examples, a dual signature protocol may be used. For example, reservation processor 102 may send reservation data 130 requesting reservations to two or more resource processors. In these examples, user 101 may desire that these two resources both are reserved during the particular time period or that neither resource is reserved. For example, both resources may be needed in a particular application. In these examples, a first one of the resources may accept a reservation and reservation data 136 may be adapted to include a pending status. The pending status may be adapted to last a defined period of time. In examples where a respective second resource processor sends corresponding reservation data 136 to registration processor 128, registration processor 128 may be configured to change the pending status to a confirmed status. In other examples, after a defined period of time, or in response to a request by reservation processor 102, registration processor 128 may be configured to cancel the reservation with the pending status.

In some examples, registration processor 128 may be configured to receive and store information regarding ratings of users and resources. For example, reservation processor 102 and/or resource processor 114 may be configured to send a rating to registration processor 128. The rating may include a signature based on the private key of the respective processor. Registration processor 128 may be configured to store these ratings in memory 134 and/or add the ratings to status request 142 and/or list data 144. In some examples, the ratings may be used by reservation processor 102 to determine whether reservation processor 102 should send reservation data 130. In some examples, the ratings may be used by resource processor 114 to determine whether resource processor 114 should accept a reservation request in reservation data 130. For example, if a user does not follow through on a reservation or a resource is not available during a reserved time, such information may affect a rating of a respective user or resource.

Among other possible benefits, using a system in accordance with the disclosure, a user may be able to create a reservation with a set of resources from multiple distinct organizations even without a prior relationship with the resources. In an example, an astronomer may be interested to view an astronomical event. The astronomer could use a system in accordance with the disclosure to reserve a telescope in Texas, a radio telescope in Australia, image processing servers in California, video conferencing rooms and a communication link among the facilities.

Resource processors can determine whether other resources have been reserved by a user even without resources communicating with each other. Resources need not know the identity of other resources. In some examples, a resource processor may accept a reservation request based on rules specific to the resource processor. In these examples, centralized general rules need not be defined and stored with a registration processor and used for all resources. Decisions to accept a reservation request can be specific to each resource. In some examples, scheduling logic need not be maintained in the registration server. In some examples, user-resource interaction may be peer-to-peer and decentralized allowing for scalability. A dual signature protocol effective to verify both a user and a resource may be used. Such a protocol may prevent unauthorized reservations or access to a user's reservation data.

Figure 2:
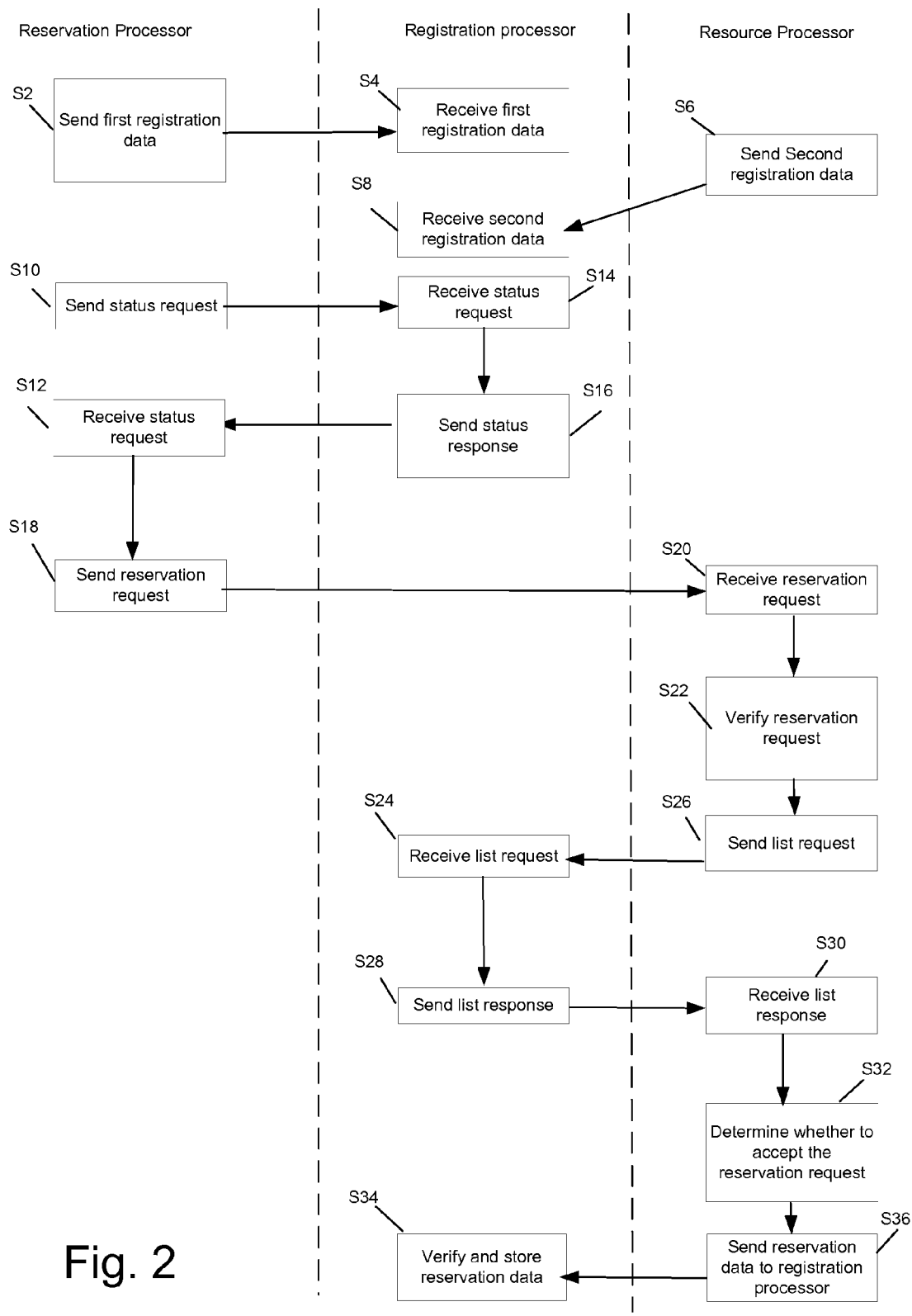
FIG. 2 depicts a flow diagram for example processes for implementing resource reservation.

FIG. 2 depicts a flow diagram for example processes for implementing resource reservation in accordance with at least some embodiments described herein. The process in FIG. 2 could be implemented using, for example, system 100 discussed above and could be used to request a reservation between a first and a second processor. An example process may include one or more operations, actions, or functions as illustrated by one or more of blocks S2, S4, S6, S8, S10, S12, S14, S16, S18, S20, S22, S24, S26, S28, S30, S32, S34 and/or S36. Although illustrated as discrete blocks, various blocks may be divided into additional blocks, combined into fewer blocks, or eliminated, depending on the desired implementation. Processing may begin at block S2 and/or block S6.

At block S2, a reservation processor may be configured to send first registration data to a registration processor. In some examples, the first registration data may include first key information relating to the reservation processor. Processing may continue from block S2 to block S4.

At block S4, the registration processor may be configured to receive the first registration data.

At block S6, a resource processor may be configured to send second registration data to the registration processor. In some examples, the second registration data may include second key information relating to the resource processor. Processing may continue from block S6 to block S8.

At block S8, the registration processor may be configured to receive the second registration data. Processing may continue from block S8 to block S10.

At block S10, the reservation processor may be configured to send a status request to the registration processor. In some examples, the status request may include a particular resource and a time range. Processing may continue from block S10 to block S14.

At block S14, the registration processor may be configured to receive the status request. Processing may continue from block S14 to block S16.

At block S16, the registration processor may be configured to send a status response to the reservation processor. In some examples, the status response may indicate whether the particular resource is available during the particular time range. Processing may continue from block S16 to block S12.

At block S12, the reservation processor may be configured to receive the status response. Processing may continue from block S12 to block S18.

At block S18, the reservation processor may be configured to send a reservation request to the resource processor. In some examples, the reservation request includes an identification of a resource in communication with the resource processor, a time range, the first key information, and a first signature of the first processor based on the first key information. Processing may continue from block S18 to block S20.

At block S20, the resource processor may be configured to receive the reservation request. Processing may continue from block S20 to block S22.

At block S22, the resource processor may be configured to verify the reservation request based on the first information. Processing may continue from block S22 to block S26.

At block S26, the resource processor may be configured to send a list request to the registration processor. In some examples, the list request includes an identification of the time range, the first signature, and a second signature of the second processor based on the second key information. In some examples, the second signature may be based on the second key information. Processing may continue from block S26 to block S24.

At block S24, the registration processor may be configured to receive the list request. Processing may continue from block S24 to block S28.

At block S28, the registration processor may be configured to send a list response to the resource processor. Processing may continue from block S28 to block S30.

At block S30, the resource processor may be configured to receive the list response. Processing may continue from block S30 to block S32.

At block S32, the resource processor may be configured to determine whether to accept the reservation request. Processing may continue from block S32 to block S36.

At block S36, in examples where the resource processor accepts the request, the resource processor may be configured to send reservation data to the registration processor. In some examples, the registration data may include an identification of the time range, the first signature, and the second signature. Processing may continue from block S36 to block S34. At block S34, the registration processor may be configured to verify and store the reservation data.

Figure 3:
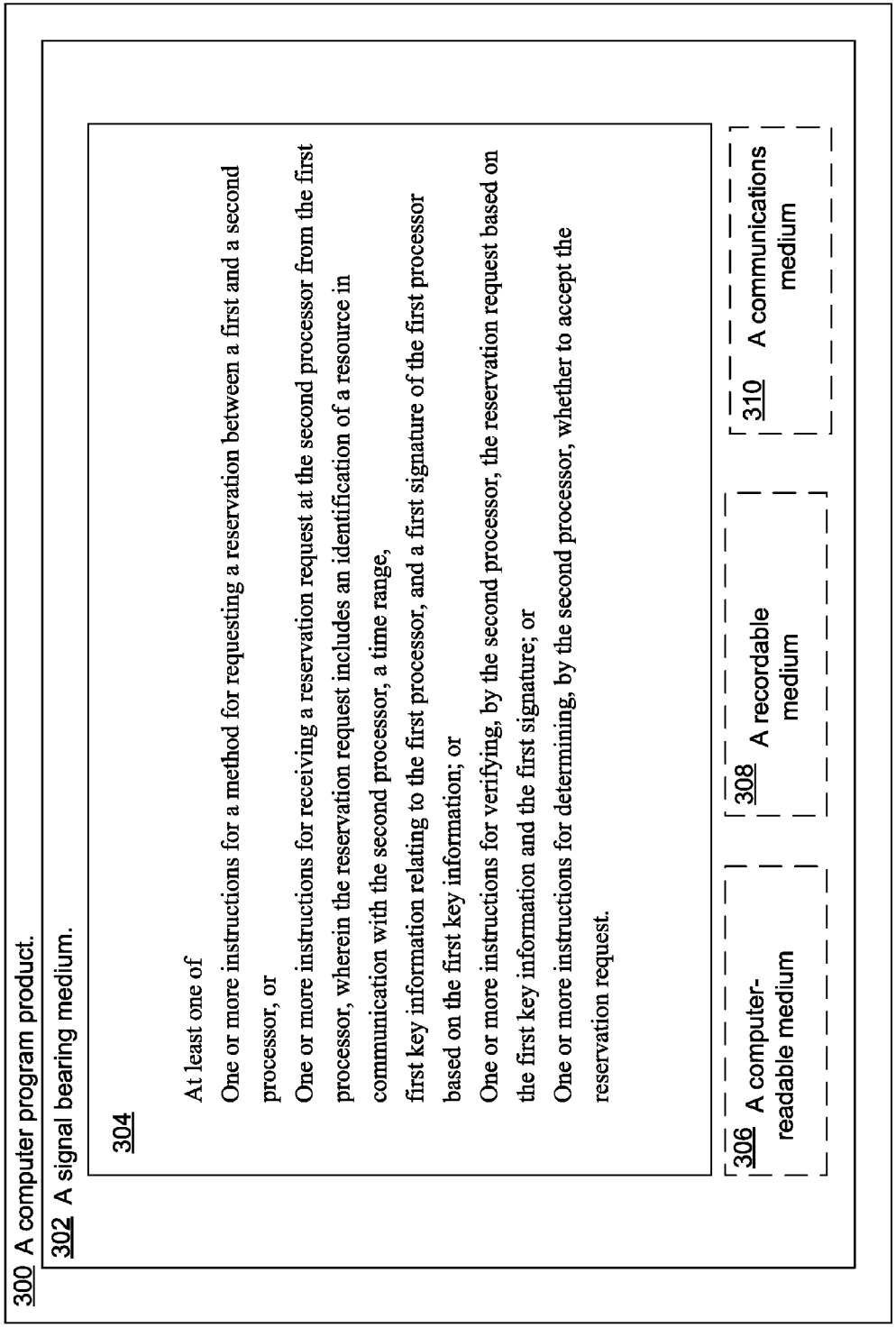
FIG. 3 illustrates a computer program product for implementing resource reservation.

FIG. 3 illustrates a computer program product 300 for implementing resource reservation in accordance with at least some embodiments described herein. Computer program product 300 may include a signal bearing medium 302. Signal bearing medium 302 may include one or more instructions 304 that, when executed by, for example, a processor, may provide the functionality described above with respect to FIGS. 1-2. Thus, for example, referring to system 100, one or more of the reservation processor 102, registration processor 128 and/or resource processor 114 may undertake one or more of the blocks shown in FIG. 3 in response to instructions 304 conveyed to the system 100 by signal bearing medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, computer program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 4:
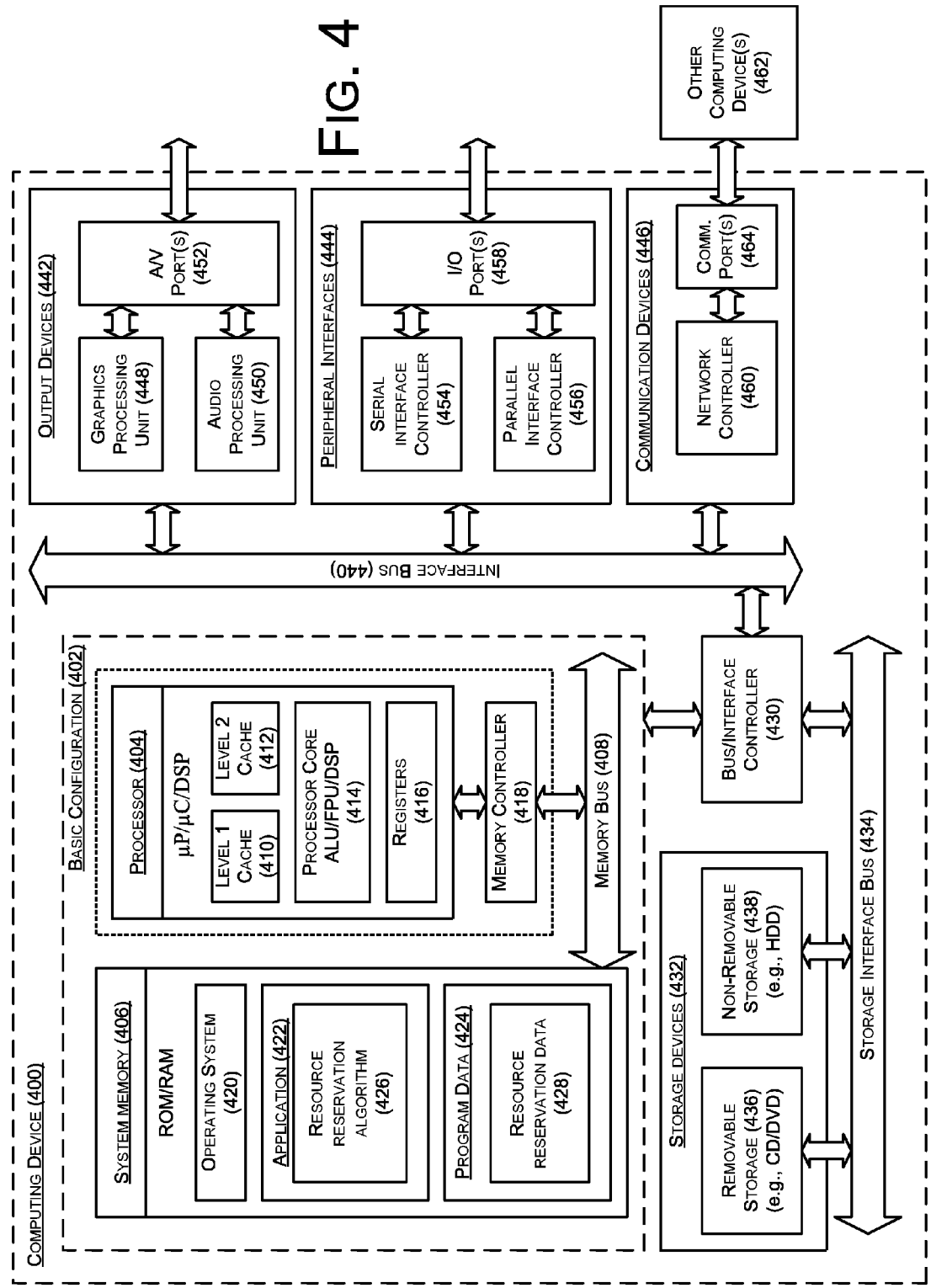
FIG. 4 is a block diagram illustrating an example computing device that is arranged to implement resource reservation, all arranged according to at least some embodiments described herein.

FIG. 4 is a block diagram illustrating an example computing device 400 that is arranged to implement resource reservation in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor ($\mu$P), a microcontroller ($\mu$C), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include a resource reservation algorithm 426 that is arranged to perform the functions as described herein including those described previously with respect to FIGS. 1-3. Program data 424 may include resource reservation data 428 that may be useful for implementing resource reservation as is described herein. In some embodiments, application 422 may be arranged to operate with program data 424 on operating system 420 such that resource reservation may be provided. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to request a reservation between a first and a second processor, the reservation relating to use of a resource in communication with the second processor, wherein first registration data relating to the first processor is storable in a third processor, and the first registration data includes first key information relating to the first processor, the method comprising:
    sending second registration data from the second processor to the third processor, wherein the second registration data includes second key information relating to the second processor;
    receiving a reservation request at the second processor from the first processor, wherein the reservation request relates to the use of the resource during a time range, the reservation request capable of being processed by two or more resources, each being different from the second processor, and wherein the reservation request includes:
        an identification that corresponds to the two or more resources, each being different from the second processor,
        the time range,
        the first key information, and
        a first signature of the first processor based on the first key information;
    verifying, by the second processor, the reservation request based on the first key information and the first signature; and
    determining, by the second processor, whether to accept the reservation request based on the verification of the reservation request, based on the identification that corresponds to the two or more resources, and based on the time range.

2. The method as recited in claim 1, further comprising:
    sending reservation data from the second processor to the third processor, wherein the reservation data includes:
        an identification of the time range,
        the first signature, and
        a second signature of the second processor based on the second key information;
    wherein the first signature is verifiable by the third processor based on the first key information; and
    wherein the second signature is verifiable by the third processor based on the second key information.

3. The method as recited in claim 2, wherein the reservation data further includes metadata relating to the resource.

4. The method as recited in claim 1, further comprising:
    sending a list request by the second processor to the third processor, wherein the list request includes:
        an identification of the time range,
        the first signature, and
        a second signature of the second processor, wherein the second signature is based on the second key information; and
    receiving by the second processor a list of the reservation data relating to the first processor and the time range.

5. The method as recited in claim 4, wherein the list request is verifiable by the third processor based on the first signature, the second signature, the first key information and the second key information.

6. The method as recited in claim 4, further comprising determining, by the second processor, whether to accept the reservation request based on the list of the reservation data.

7. The method as recited in claim 1, wherein a first rating of the second processor is storable at the third processor, and the method further comprises sending, to the third processor from the second processor, a second rating of the first processor.

8. The method as recited in claim 7, wherein:
    the first rating includes a first signature based on the first key information;
    the second rating includes a second signature based on the second key information;
    the first rating is verifiable by the third processor based on the first signature and the first key information; and
    the second rating is verifiable by the third processor based on the second signature and the second key information.

9. The method as recited in claim 1, wherein a status request is storable at the third processor from the first processor, and the status request indicates the resource and the time range.

10. The method as recited in claim 1, wherein:
    the reservation request is a first reservation request,
    a second reservation request is storable at a fourth processor, the second reservation request includes:
        an identification of a resource in communication with the fourth processor,
        a time range,
        the first key information,
        the first signature; and
    the reservation request from the second processor is cancellable by the third processor when the third processor does not receive a reservation request from the fourth processor within a defined period of time.

11. The method as recited in claim 1, further comprising:
    receiving, by the second processor, a receipt from the third processor, wherein the receipt includes the first signature, the second signature, and the time range; and
    sending the receipt from the second processor to the first processor.

12. The method as recited in claim 1, wherein the reservation request includes a request to cancel a reservation.

13. A system effective to request a reservation between a first and a second processor, the reservation relating to use of a resource effective to be in communication with the second processor, the system comprising:
    a first processor;
    a second processor, wherein the second processor is effective to be in communication with the first processor;

a third processor, wherein the third processor is effective to be in communication with the first processor and the second processor;

the third processor is effective to:
receive first registration data from the first processor, wherein the first registration data includes first key information relating to the first processor;
receive second registration data from the second processor, wherein the second registration data includes second key information relating to the second processor;

the second processor is effective to receive a reservation request from the first processor, wherein the reservation request relates to the use of the resource during a time range, the reservation request capable of being processed by two or more resources, each being different from the second processor, and wherein the reservation request includes:
an identification that corresponds to the two or more resources, each being different from the second processor,
the time range,
the first key information, and
a first signature of the first processor based on the first key information; and the second processor is effective to:
verify the reservation request based on the first key information and the first signature; and
determine whether to accept the reservation request based on the verification of the reservation request, based on the identification that corresponds to the two or more resources, and based on the time range.

14. The system as recited in claim 13, wherein:
the second processor is effective to send reservation data from the second processor to the third processor, wherein the reservation data includes:
metadata relating to the resource,
an identification of the time range,
the first signature, and
a second signature of the second processor based on the second key information; and
the third processor is effective to:
verify the first signature based on the first key information;
verify the second signature based on the second key information; and
store the reservation data in a memory.

15. The system as recited in claim 13, wherein:
the second processor is further effective to send a list request to the third processor, wherein the list request includes:
an identification of the time range,
the first signature, and
a second signature of the second processor based on the second key information; and
the second processor is effective to receive from the third processor, a list of the reservation data relating to the first processor and the time range.

16. The system as recited in claim 13, wherein the third processor is effective to:
receive from the first processor a first rating of the second processor;
receive from the second processor a second rating of the first processor; and
store the first and second rating in the memory.

17. The system as recited in claim 13, wherein the third processor is effective to:
receive a status request from the first processor, wherein the status request indicates the resource and the time range; and
send to the first processor, a status response, wherein the status response indicates whether the resource is available in the time range.

18. A method to request a reservation between a first and a second processor, the reservation relating to use of a resource in communication with the second processor, the method comprising:
receiving, at a third processor, first registration data from the first processor, wherein the first registration data includes first key information relating to the first processor;
receiving, at the third processor, second registration data from the second processor, wherein the second registration data includes second key information relating to the second processor;
receiving a reservation request at the second processor from the first processor, wherein the reservation request relates to the use of the resource during a time range, the reservation request capable of being processed by two or more resources, each being different from the second processor, and wherein the reservation request includes:
an identification that corresponds to the two or more resources, each being different from the second processor,
the time range,
the first key information, and
a first signature of the first processor based on the first key information;
sending a list request by the second processor to the third processor, wherein the list request includes:
an identification of the time range,
the first signature, and
a second signature of the second processor, wherein the second signature is based on the second key information;
receiving by the second processor, from the third processor, a list of the reservation data relating to the first processor and the time range; and
determining, by the second processor, whether to accept the reservation request based on the list of the reservation data, based on the identification that corresponds to the two or more resources, and based on the time range.

19. The method as recited in claim 18, further comprising:
sending reservation data from the second processor to the third processor, wherein the reservation data includes:
an identification of the time range,
the first signature,
metadata relating to the resource, and
the second signature; and
storing, by the third processor, the reservation data in a memory.

* * * * *